(No Model.)
H. G. PARSONS & W. A. BROWN.
BELT FASTENER.
No. 428,130. Patented May 20, 1890.
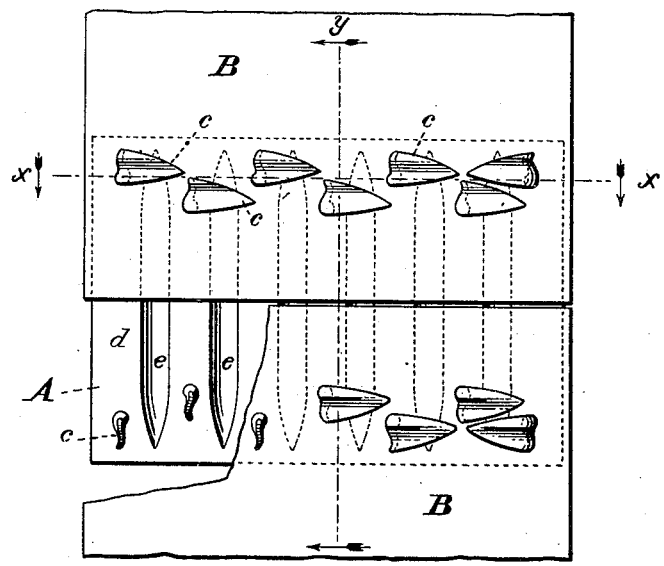
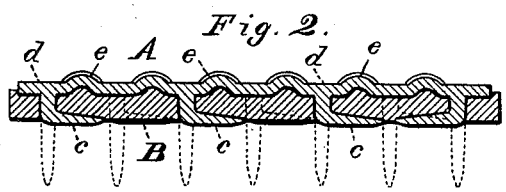
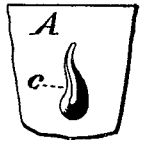
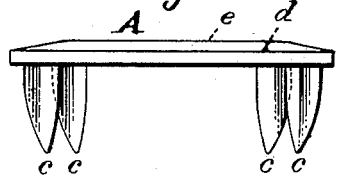
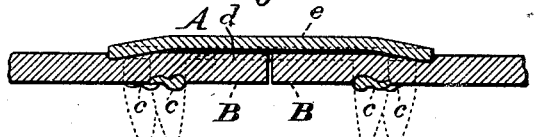
WITNESSES
Villett Anderson,
Philip C. Masi.
INVENTORS
H. G. Parsons
W. A. Brown
by E. W. Anderson
their Attorney.

UNITED STATES PATENT OFFICE.

HENRY G. PARSONS AND WILLIAM A. BROWN, OF NEW BRITAIN, CONNECTICUT.

BELT-FASTENER.

SPECIFICATION forming part of Letters Patent No. 428,130, dated May 20, 1890.

Application filed August 1, 1889. Serial No. 319,408. (No model.)

*To all whom it may concern:*

Be it known that we, HENRY G. PARSONS and WILLIAM A. BROWN, citizens of the United States, and residents of New Britain, in the county of Hartford and State of Connecticut, have invented certain new and useful Improvements in Belt-Fastenings; and we do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a representation of this invention, and is a bottom view showing teeth bent down upon the leather and teeth standing. Fig. 2 is a section taken where the broken line $x$ $x$ is marked on Fig. 1. Fig. 3 is a detail showing tooth on under side of plate. Fig. 4 is an end view of plate, showing side view of teeth. Fig. 5 is a section taken where the broken line $y$ $y$ is marked on Fig. 1.

This invention relates to fasteners for the meeting ends of machine-belting; and it consists in the novel construction and combination of parts, as hereinafter described, and pointed out in the claim.

In the accompanying drawings, the letter A designates the fastener-plate, which is made of malleable metal, and B is the belting secured thereto by the corrugated teeth $c$. The surface of the plate A over the ends of the belting B is provided with a series of corrugations consisting of the flattened bearings $d$, from which the teeth $c$ project, and which become flush with the surface near the margin of the plate, and the elongated depressions or indentations $e$ between the rib corrugations, as shown, these indentations terminating near the edges of the plate. The corrugations and channels are designed for the purpose of receiving the adjacent surface of the belting, which is pressed down and held in position by the angular corrugated teeth $c$, which are forced through the ends of the belting and clinched on the under surface thereof. The object of the bearings $d$ and indentations $e$ is to prevent lateral shrinkage of the belt ends, and also to act as a medium of resistance for the same in the fastening. When the leather or rubber composing the belt is pressed down against the plate A, it fills the channels $e$, and the bearings $d$ also fit themselves in the leather or rubber, the ends of belting becoming thereby intimately adjusted to the corrugated surface of the plate. The plate A is also provided with fastening-teeth $c$, projecting from the rib corrugations, one at each end, each alternate tooth being a little in advance of the other. These teeth are designed to hold the ends of the belting, whose meeting edges are in the middle of the plate. The tooth $c$ is angular in side view and pointed to readily pierce the belting. It is thick and round on its inner vertical edge to afford a broad surface for resistance to the belting, and it gradually grows thinner toward its outer edge, which is sufficiently inclined and acute to facilitate cutting its way through the belting material. The teeth are corrugated transversely or in the direction of strain, and by thus corrugating the sides of the teeth a peculiar or wave-like shape is given them, as shown in horizontal section in Fig. 3 of the drawings, and as the material of the belting enters lateral indentations or channels of the corrugations an important means of resistance against the tearing away of the belt ends is afforded not given by a tooth whose sides are smooth.

What we claim as new, and desire to secure by Letters Patent, is—

A belt-fastener consisting of the plate having transverse flattened bearings $d$, the elongated channels $e$, and the teeth $c$, projecting from the rib corrugations, one at each end, each alternate tooth being a little in advance of the other and angular in cross-section and pointed at their free ends, having thick and rounded inner vertical edges and thin outer edges, thereby possessing a wave-like form, substantially as set forth.

In testimony whereof we affix our signatures in presence of two witnesses.

HENRY G. PARSONS.
WILLIAM A. BROWN.

Witnesses:
ROLLIN C. WOOSTER,
L. S. BURR.